United States Patent
Tien et al.

(10) Patent No.: US 12,505,078 B1
(45) Date of Patent: Dec. 23, 2025

(54) REDUCING ELECTRONIC SERVICE DISRUPTIONS DURING DATABASE MIGRATION

(71) Applicant: PAYPAL, INC., San Jose, CA (US)

(72) Inventors: Shuping Tien, San Jose, CA (US); Kenneth Kang, Campbell, CA (US); Samrat Roy, San Jose, CA (US); Bin Zhang, San Jose, CA (US); Pareshkumar Somabhai Patel, Coppell, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/750,587

(22) Filed: Jun. 21, 2024

(51) Int. Cl.
*G06F 16/20* (2019.01)
*G06F 11/14* (2006.01)
*G06F 16/21* (2019.01)
*G06F 16/27* (2019.01)

(52) U.S. Cl.
CPC ........ *G06F 16/214* (2019.01); *G06F 11/1446* (2013.01); *G06F 16/275* (2019.01)

(58) Field of Classification Search
CPC ... G06F 16/214; G06F 16/275; G06F 11/1446
See application file for complete search history.

(56) References Cited

U.S. PATENT DOCUMENTS

| | | | |
|---|---|---|---|
| 6,151,608 A | 11/2000 | Abrams | |
| 8,812,447 B1 | 8/2014 | Anderson | |
| 10,691,654 B2 | 6/2020 | Higginson | |
| 11,449,257 B2 * | 9/2022 | Rao | G06F 13/4027 |
| 2015/0254257 A1 * | 9/2015 | Kritchko | G06F 16/214 |
| | | | 707/634 |
| 2019/0079929 A1 * | 3/2019 | Annamalai | G06F 16/214 |
| 2023/0333996 A1 * | 10/2023 | Glimcher | G06F 13/105 |
| 2024/0004701 A1 * | 1/2024 | O'Shea | G06F 9/4856 |

* cited by examiner

*Primary Examiner* — Diedra McQuitery
(74) *Attorney, Agent, or Firm* — HAYNES AND BOONE, LLP

(57) ABSTRACT

A source database and a target database are accessed. The source database contains data to be migrated over to the target database. The read operations from the target database and the write operations to the target database are ceased, while the read operations from the source database and the write operations to the source database are maintained. The data from the source database is replicated to the target database. During the replication, the read operations from the source database are maintained but the write operations to the source database are ceased, while the read operations from the target database and the write operations to the target database are also ceased. After the replication has been completed, the read operations from the source database and the write operations to the source database are ceased. The read operations from the target database and the write operations to the target database are resumed.

20 Claims, 10 Drawing Sheets

REDUCING ELECTRONIC SERVICE DISRUPTIONS DURING DATABASE MIGRATION

BACKGROUND

Field of the Invention

The present application generally relates to database migration. More particularly, the present application involves reducing potential disruptions to electronic services during a database migration process.

Related Art

Over the past several decades, rapid advances in integrated circuit fabrication, computer software, and wired/wireless telecommunications technologies have brought about the arrival of the information age, where electronic activities and/or online transactions are becoming increasingly more common. For example, applications (e.g., mobile applications executing on a smartphone) may provide various services and/or functionalities, such as shopping online, making electronic payments, browsing a social media network, providing route navigation, playing media content, composing emails, setting up and/or attending video or audio calls/meetings, accessing non-public data, etc. The proper execution of many of these applications involves accessing electronic databases. For example, the applications may receive electronic data from the electronic databases and/or send electronic data to the electronic databases, and different applications may be associated with different electronic databases. From time to time, the electronic data on any one of the electronic databases may need to be moved over to another electronic database. During such an electronic database migration process, electronic connections to the electronic databases may be cut off for any number of reasons, including device issues, network connectivity, and application issues, which may cause disruptions to some of the services and/or functionalities of the applications or services that rely on the electronic databases and lead to user frustration.

Therefore, although existing electronic database migration schemes are generally adequate for their intended purposes, they have not been entirely satisfactory in every aspect. What is needed is an improved electronic database migration scheme that can reduce the disruptions during the migration process.

Figure 1:
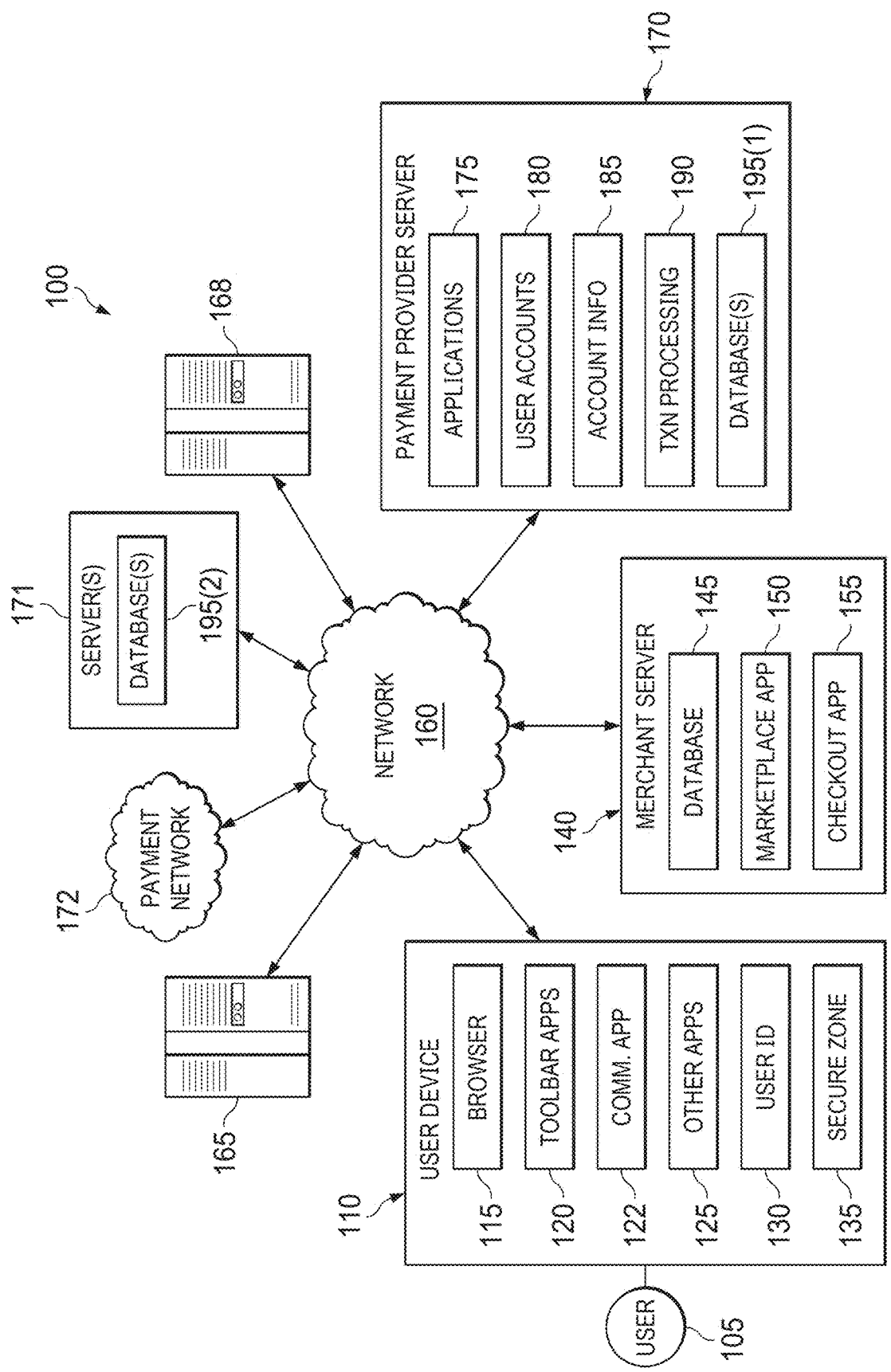
FIG. 1 is a block diagram of a networked system according to various aspects of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

The present disclosure pertains to an improved database migration scheme, in which electronic connections are maintained with both a source database (from which electronic data is to be migrated) and a target database (to which the electronic data is migrated), which helps reduce disruptions to apps and/or services that rely on the database data. In more detail, the proper execution of applications or services involves accessing one or more electronic databases from time to time. However, in order to ensure proper compliance with various requirements (e.g., data security requirements or storage space considerations), the electronic data from a source database may need to be migrated over to a target database, which is an example scenario of a database migration. During such a database migration process, conventional schemes typically shut off the connections with both the source database and the target database at some point, which renders the electronic data in these databases inaccessible to the applications and/or services that need them for proper execution. As a result, end users of these applications and/or services may experience undesirable disruptions. In addition, even after the data has been successfully migrated over to the target database, the previously terminated electronic connections to the database(s) may need to be re-established. Reestablishing the connections may be a time-consuming process, especially when the number of connections is large (e.g., tens of thousands, or more). As a result of the need to re-establish the connections to the database(s), the end users may once again experience undesirable delay when attempting to execute the applications or services on their user devices, and service providers may need to consume additional computing resources to re-establish connections and finish data migrations.

The present disclosure overcomes the above problems by maintaining electronic connections to the source database and the target database during the database migration process via a gateway client. The gateway client configures the database read and write operations (and the sequences thereof)—while maintaining the electronic connections to the source and target databases—to ensure that potential disruptions to the relevant applications and/or services are minimized during the database migration process. For example, a database migration may include a data replication process, in which electronic data is replicated from a source database to a target database, with the goal to eventually shut down the source database once the migration is complete and/or other specified criteria are met. In such a data replication process, before the data from the source database is replicated to the target database, the gateway client may temporarily cease (e.g., by pausing) read operations from the target database and write operations to the target database, while maintaining the read operations from the source database and the write operations to the source database. Thereafter, as the data is electronically replicated from the source database to the target database, the read operations from the source database are maintained by the gateway client, but the write operations to the source database are ceased. Meanwhile, the read operations from the target database and the write operations to the target database remain ceased. After the database migration has been completed, the gateway client ceases the read operations from the source database (in addition to the write operations to the source database), and resumes the read operations from the target database and the write operations to the target database. It is understood that one of the objectives of the present disclosure is to reverse the roles of the source and target databases without immediately shutting down the old source database. The old source database will eventually be decommissioned during a major software and/or hardware stack upgrade. During minor version upgrades, the old source database may serve as a passive copy.

Again, throughout the above process, the gateway client keeps the electronic connections open with respect to both the source database and the target database. In addition to reducing potential disruptions to applications or services, the data migration scheme of the present application also conserves valuable electronic resources (e.g., electronic memory storage, computer processor usage, telecommunications network bandwidth) by avoiding the need to re-establish a large number of electronic connections with the database(s) once the data has been replicated over to the target database. The various aspects of the present disclosure are discussed in more detail with reference to FIGS. 1-8.

FIG. 1 is a block diagram of a networked system 100 that illustrates an example context in which embodiments of the database migration schemes of the present disclosure may occur. Networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The system 100 may include a user device 110, a merchant server 140, an acquirer host 165, an issuer host 168, a payment provider server 170, one or more other server(s) 171, and a payment network 172 that are in communication with one another over a network 160. Payment provider server 170 may be maintained by a digital wallet provider (e.g., a payment service provider), such as PayPal™, Inc. of San Jose, CA. A user 105, such as a consumer or a customer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that a transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, server(s) 171, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100. User device 110 may also include other applications 125, for example the mobile applications that are downloadable from the Appstore™ of APPLE™ or GooglePlay™ of GOOGLE™.

In conjunction with user identifiers 130, user device 110 may also include a secure zone 135 owned or provisioned by the payment service provider with agreement from device manufacturer. The secure zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

Still referring to FIG. 1, merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145, which can be a source or a target database for data migrations with other databases of system 100, identifying available products and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

The merchant server 140 may also host a website for an online marketplace, where sellers and buyers may engage in purchasing transactions with each other. The descriptions of the items or products offered for sale by the sellers may be stored in the database 145. The database 145 may also store other types of electronic data that is needed by certain applications or services, for example, by one or more of the other applications 125 of the user device 110. In some embodiments, the services may include an internal process that calls into the database, such as a part of an internal software process (e.g., can be a part of risk assessment, compliance, authentication, etc.). It is understood that a service can occur outside of the applications 175 (discussed below) calling into it. The merchant server 140 also may include a checkout application 155 which may be configured to facilitate the purchase by user 105 of goods or services online or at a physical POS or store front. Note that the services that can be purchased by the user 105 are not to be confused with the services that may call into the database discussed above. The services that can be purchased by the user 105 may include (but are not limited to) Internet service plans, cellular phone service plans, digital media streaming service plans, website hosting service plans, cloud storage service plans, etc. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, third party financial service providers, such as associated with payment provider server 170, credit cards, debit cards, checks, money orders, or the like.

Payment provider server 170 may be maintained, for example, by an online digital wallet provider which may provide payment between user 105 and the operator of merchant server 140. In this regard, payment provider server 170 may include one or more applications 175, which may be configured to interact with user device 110 and/or merchant server 140 over network 160 to provide various services. For example, in some embodiments, the applications 175 may include a payment application that facilitates the purchase of goods or services (purchasable by users), communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Advantageously, application 175 may be configured to interact with merchant server 140 on behalf of user 105 during a transaction with checkout application 155 to track and manage purchases made by users and which and when funding sources are used. Application 175 may be further configured to determine the existence of and to manage accounts for user 105, as well as create new accounts if necessary.

A transaction processing application 190, which may be part of application 175 or separate, may include one or more applications to process information from user 105 for processing a transaction for the user 105, such as an order and payment using various selected funding instruments, as described herein. As such, transaction processing application 190 may store details of a transaction from individual users, including funding source used, credit options available, etc.

The transaction processing application 190 may be configured to receive information from user device 110 and/or merchant server 140 for processing and storage in one or more databases 195, which can be a source or a target database for data migrations with other databases of system 100. The databases 195 may store electronic data that, when accessed, allows various applications (e.g., mobile applications or desktop applications, including but not limited to the applications 175 on the payment provider server 170, the applications 150 and 155 on the merchant server 140, or the various applications 120, 122 and 125 on the user device 110) to provide various types of functionalities and/or services. It is understood not all of the databases 195 need to reside on the payment provider server 170. For example, whereas a database 195(1) may reside on the payment provider server 170, some of the databases 195 (such as database 195(2)) may reside on one or more additional server(s) 171 that are external to, and different from, the payment provider server 170. For reasons of simplicity, however, the database(s) 195(1) and/or 195(2) may be collectively referred to as database(s) 195. Regardless, access to the electronic data stored on the databases 195 residing on the additional servers 171 may also be obtained at least in part via the network 160. As will be discussed in more detail below, various aspects of the present disclosure are direct to an improved scheme for migrating the electronic data from the databases 195 (or the databases 145) to other databases.

Still referring to FIG. 1, the payment network 172 may be operated by payment card service providers or card associations, such as DISCOVER™, VISA™, MASTER-CARD™ AMERICAN EXPRESS™, RUPAY™, CHINA UNION PAY™, etc. The payment card service providers may provide services, standards, rules, and/or policies for issuing various payment cards. A network of communication devices, servers, and the like also may be established to relay payment related information among the different parties of a payment transaction.

Acquirer host 165 may be a server operated by an acquiring bank or other financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Figure 2:
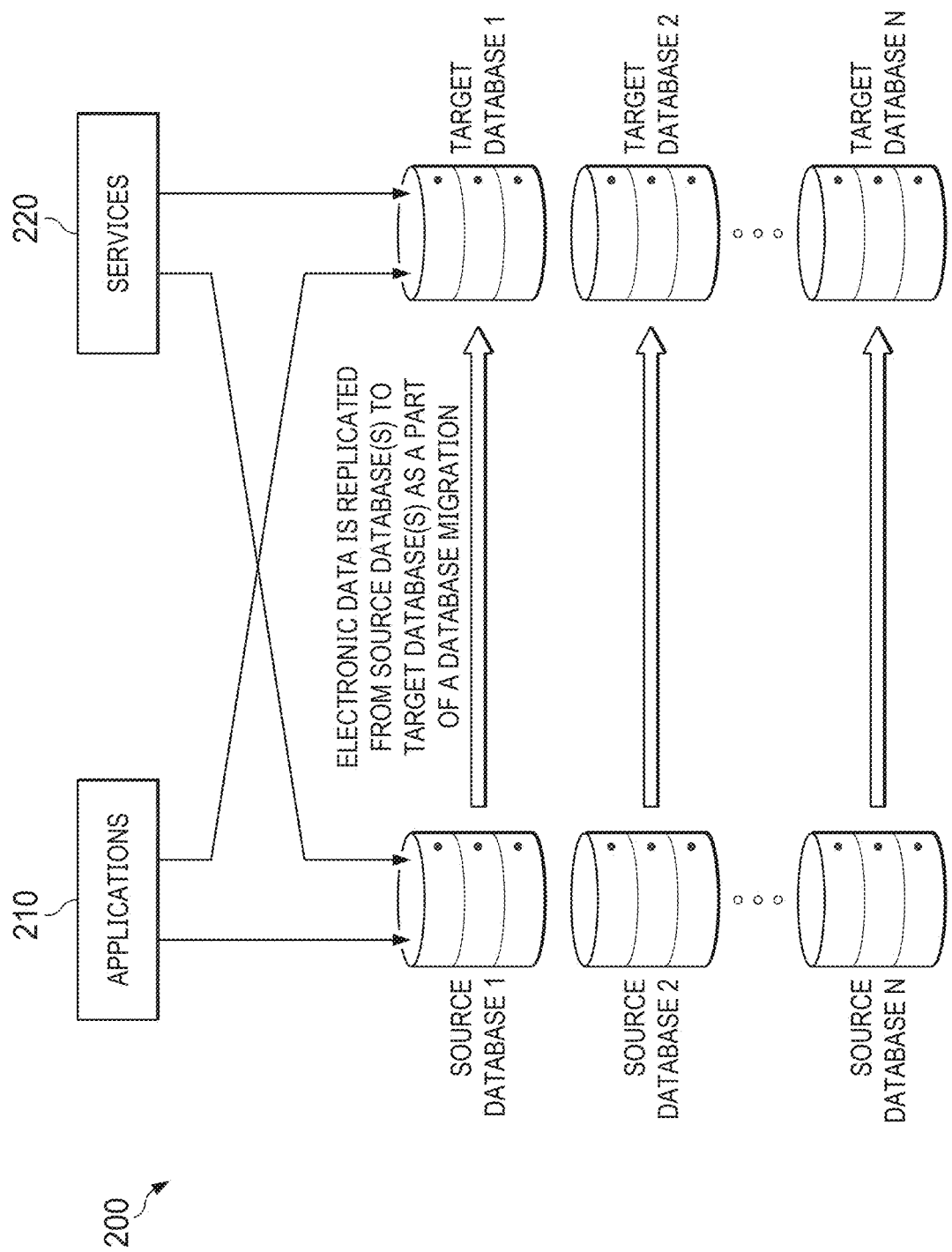
FIG. 2 illustrates a simplified block diagram of a database migration scheme according to various aspects of the present disclosure.

Referring now to FIG. 2, a simplified block diagram of a database migration scheme 200 is illustrated according to an embodiment of the present disclosure. The database migration scheme 200 includes a data replication process, in which the data is electronically copied from one or more source databases (e.g., source databases 1, 2 . . . N) to one or more target databases (e.g., target databases 1, 2 . . . N), respectively. In some embodiments, one or more of the source databases 1-N and/or one or more of the target databases 1-N may reside on the payment provider server 170, on the server(s) 171, or on the merchant server 140 of FIG. 1. For example, the source database 1 may be an embodiment of one of the databases 195 residing on the payment provider server 170. Similarly, the target database 1 may be an embodiment of one of the databases 195 residing on the payment provider server 170, the target database 2 may be an embodiment of one of the databases 195 residing on the server(s) 171, and the target database N may be an embodiment of one of the databases 145 residing on merchant server 140.

FIG. 2 also illustrates a plurality of applications 210 and a plurality of services 220. The data stored on the source databases 1-N (and their corresponding target databases 1-N) may enable different functionalities for different applications of the applications 210 and/or allow different services of the services 220 to be provided. For example, the electronic data stored on the source database 1 (which will be replicated to the target database 1 as a part of the database migration) may be accessed by a first one of the applications 210 (which may be an embodiment of one of applications 175 of the payment provider server 170 of FIG. 1) to provide a first type of functionality and/or allow a first one of the services 220 to be provided, such as a payment processing service and/or functionality. As another example, the electronic data stored on the source database 2 (which will be replicated to the target database 2) may be accessed by a second one of the applications 210 (which may be an embodiment of one of the applications 125 of the user device 110 of FIG. 1) to provide a second type of functionality and/or allow a second one of the services 220 to be provided, such as an electronic social networking service and/or functionality, where a plurality of users interact with one another electronically (e.g., send messages, post pictures/videos, update statuses, etc.) via an electronic platform hosted by a social networking provider. As yet another example, the electronic data stored on the source database N (which will be replicated to the target database N) may be accessed by the a third one of the applications 210 (which may be an embodiment of the marketplace application 150 of the merchant server 140 of FIG. 1) to provide a third type functionality or allow a third one of the services 220 to be provided, such as an online shopping service and/or functionality, where the users may browse an electronic marketplace and initiate purchases of one or more services and/or products offered for sale via the electronic marketplace. As will be discussed in more detail below, one of the goals of the present disclosure is to minimize the potential disruptions to the applications 210 and/or services 220 as electronic data is replicated from the source databases 1-N to their respective target databases 1-N.

Figure 3:
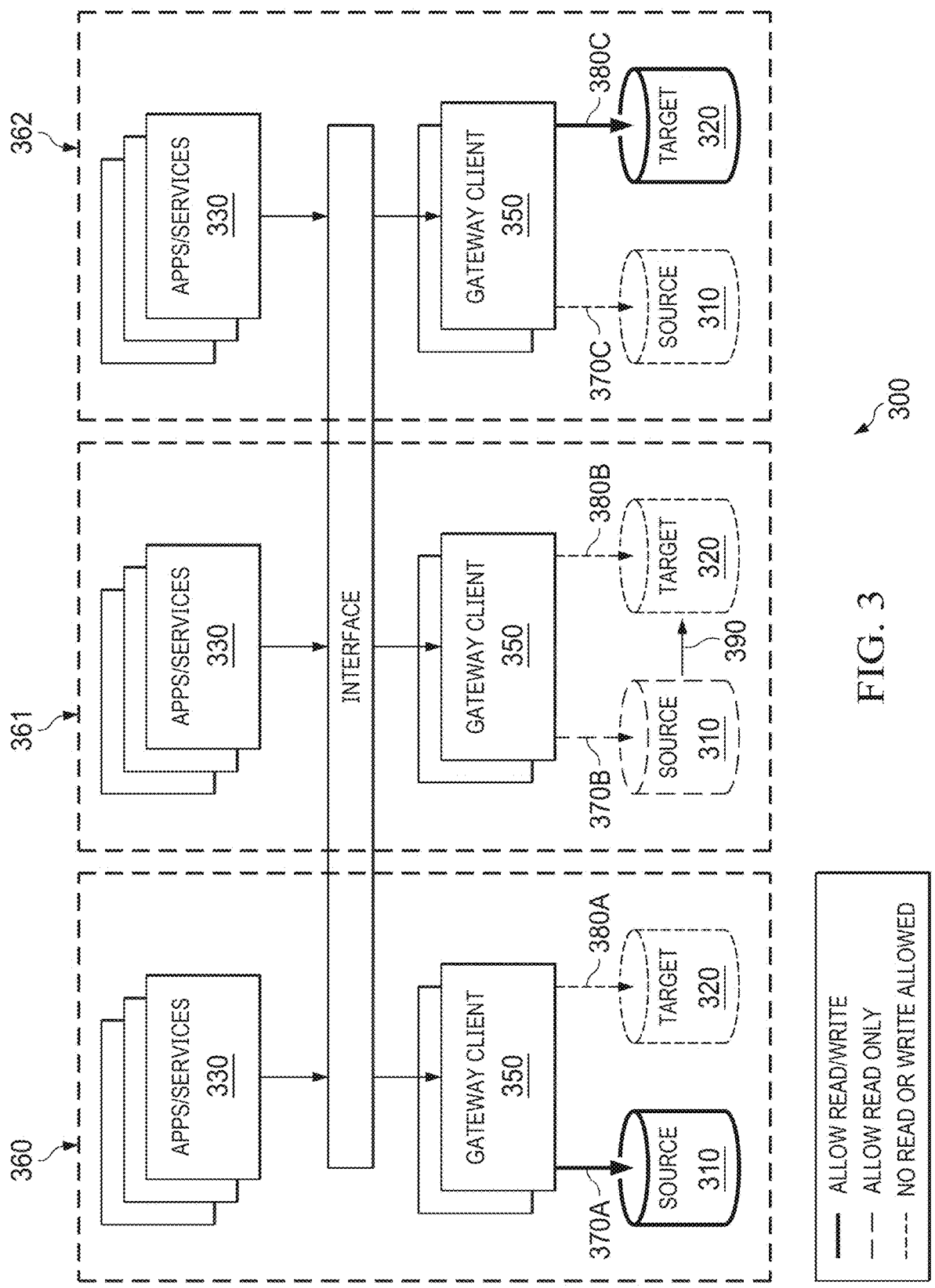
FIG. 3 illustrates a process flow of a database migration according to embodiments of the present disclosure.

Referring now to FIG. 3, a process flow 300 (from the left of the figure to the right of the figure) illustrates the database migration of the present disclosure at a high level. For example, as a part of the database migration, the electronic data of a source database 310 (as an example embodiment of one of the source databases 1-N of FIG. 2) is to be replicated over to a target database 320 (as an example embodiment of one of the target databases 1-N of FIG. 2). The electronic data residing on the source database 310 (and eventually on the target database 320) may be needed to ensure the proper execution of various applications or services 330. The applications or services 330 may include embodiments of the applications 210 and/or the services 220 discussed above with reference to FIG. 2.

For example, in some embodiments, a mobile application executing on a user's device (e.g., the applications 125 executing on the user device 110 of FIG. 1) or an application executing on a server (e.g., the applications 175 executing on the payment provider server 170 of FIG. 1) may need to access the electronic data stored on the source database 310 (to be migrated to the target database 320) from time to time. It would be undesirable for the electronic data to be available when they need to be accessed by the applications or services 330. Unfortunately, conventional database migration schemes may lead to a relatively long outage period, during which the electronic data is unavailable for access. For example, conventional database migration schemes not only cut off the write access to the source and/or target databases, but also the read access from the source and/or target databases. Furthermore, conventional database migration schemes may also need to re-establish a relatively large number of electronic connections with the source and/or target databases (since the electronic connections were previously terminated before the database migration process began). The large number of reconnections may require a long time period to complete, which may prolong the outage period during which access to the electronic data is unavailable. As a result, providing the applications or services 330 to users may be disrupted, delayed, or even fail.

To address the issues discussed above, the present disclosure implements a gateway client 350 to manage the connections with the databases 310-320 and at least portions of the database migration process that includes the sequence of ceasing and/or resuming read and write operations with respect to the databases. The gateway client 350 may reside on a server, for example, on the servers 171 or on the payment provider server 170. In some embodiments, the gateway client 350 may comprise an open-source software application. The gateway client 350 may also serve as a communication interface between the application or services 330 and the source database 310 and the target database 320.

The process flow 300 may begin with a step 360, which may be performed in preparation for the data replication from the source database 310 to the target database 320, but before the actual data replication officially occurs. In the step 360, the gateway client 350 accesses a plurality of electronic connections 370A with the source database 310 and a plurality of electronic connections 380A with the target database 320. In some embodiments, a connection may act as a channel between the database and the gateway client 350, facilitating exchanges of requests and/or responses between them. Although these electronic connections 370A and 380A are each represented as a single arrow for reasons of simplicity, it is understood that they may each correspond to a high number of channels in actuality, for example, a number in the range of, or exceeding, tens of thousands.

According to step 360, the gateway client 350 maintains the read operations from the source database 310 and the write operations to the source database 310 via the electronic connections 370A. Meanwhile, the gateway client 350 pauses the read operations from the target database 320 and write operations to the target database 320 via the electronic connection 380A. It is understood, however, that the pausing of the read and write operations with respect to the target database 320 does not cut off the electronic connections to the target database 320. In other words, the same number of electronic connections are open and maintained between the gateway client 350 and the target database 320 before and after the read and write operations are paused with respect to the target database 320.

The process flow 300 continues with a step 361, in which data replication 390 (e.g., as a part of the database migration) actually takes place. In other words, electronic data residing on the source database 310 is replicated on the target database 320. Before the data replication 390 takes place, the gateway client 350 pauses the write operations to the source database 310 but maintains the read operations from the source database 310 via the electronic connections 370B. Meanwhile, the write operations to the target database 320 and the read operations from the target database 320 remain paused. Again, the pausing of the write operations to the source database 310 does not cut off the electronic connections to the source database 310, and the fact that the read operations and write operations remain paused with respect to the target database 320 does not cut off the electronic connections to the target database 320 either.

It is understood that since the electronic connections 370B are still active during the step 361, the applications or services 330 may still perform read operations from the source database 310, such that some of the functionalities and/or services that depend on just the read operations but not the write operations may still be provided. For example, a mobile application may read from the source database 310 to perform certain tasks (e.g., logging into a user account and populating certain segments of a user interface of the mobile application). These functionalities and/or services do not require writing data to the source database 310, and therefore the users may not even notice any disruption to the execution of the mobile application while the data replication 390 is actively taking place.

The process flow 300 continues with a step 362, in which the data replication 390 has been completed. At this point, via the electronic connections 370C, the gateway client 350 pauses the read operations from the source database 310, and the write operations to the source database 310 have already been previously paused in step 361. Again, the pausing of the read operations from the source database 310 does not cut off the electronic connections to the source database 310 either. In other words, the electronic communications channels 370C need not be re-established in step 362. In addition, the gateway client 350 resumes both the read operations from the target database 320 and the write operations to the target database 320 via the electronic connections 380C. In some embodiments, the read operations from the target database and the write operations to the target database are not resumed all at once but according to a specified schedule. For example, the read and/or write operations may resume by allowing the read and/or write operations to take place on a predefined percentage (e.g., 10%) of the electronic connections 380C at predefined time periods (e.g., every 10 seconds). Again, the electronic connections 380C need not be re-established in step 362 either.

As a result of the step 362 being performed, the read and/or write outages may end after the step 362 is completed, since the applications and/or services 330 may now read data from the target database 320, and write data to the target database 320, once again. The fact that the electronic connections 370A-370C and 380A-380C remain open throughout the process flow 300 not only minimizes potential disruption to the applications or services 330, but also reduces the total amount of read/write outage time, which may be attributed at least in part due to the fact that no reconnections need to be established with the source or target databases.

Based on the above discussions, it can be seen that the gateway client 350 keeps the electronic connections open with respect to both the source database 310 and the target database 320 throughout the steps 360-362 of the database migration process. This allows at least the read operations to continue with respect to at least one of the source database 310 or the target database 320, which helps to minimize potential disruptions of applications or services 330 experienced by the user. It is also understood that various error conditions may arise during the steps 360-362 of the process flow 300. According to various aspects of the present disclosure, based on a satisfaction of one or more specified error conditions, one or more rollback processes may be performed during the steps 360-362, in which the data replicated to the target database 320 is restored back to the source database 310. The rollback processes will be discussed in greater detail below with reference to FIGS. 5A-5C.

Figure 4:
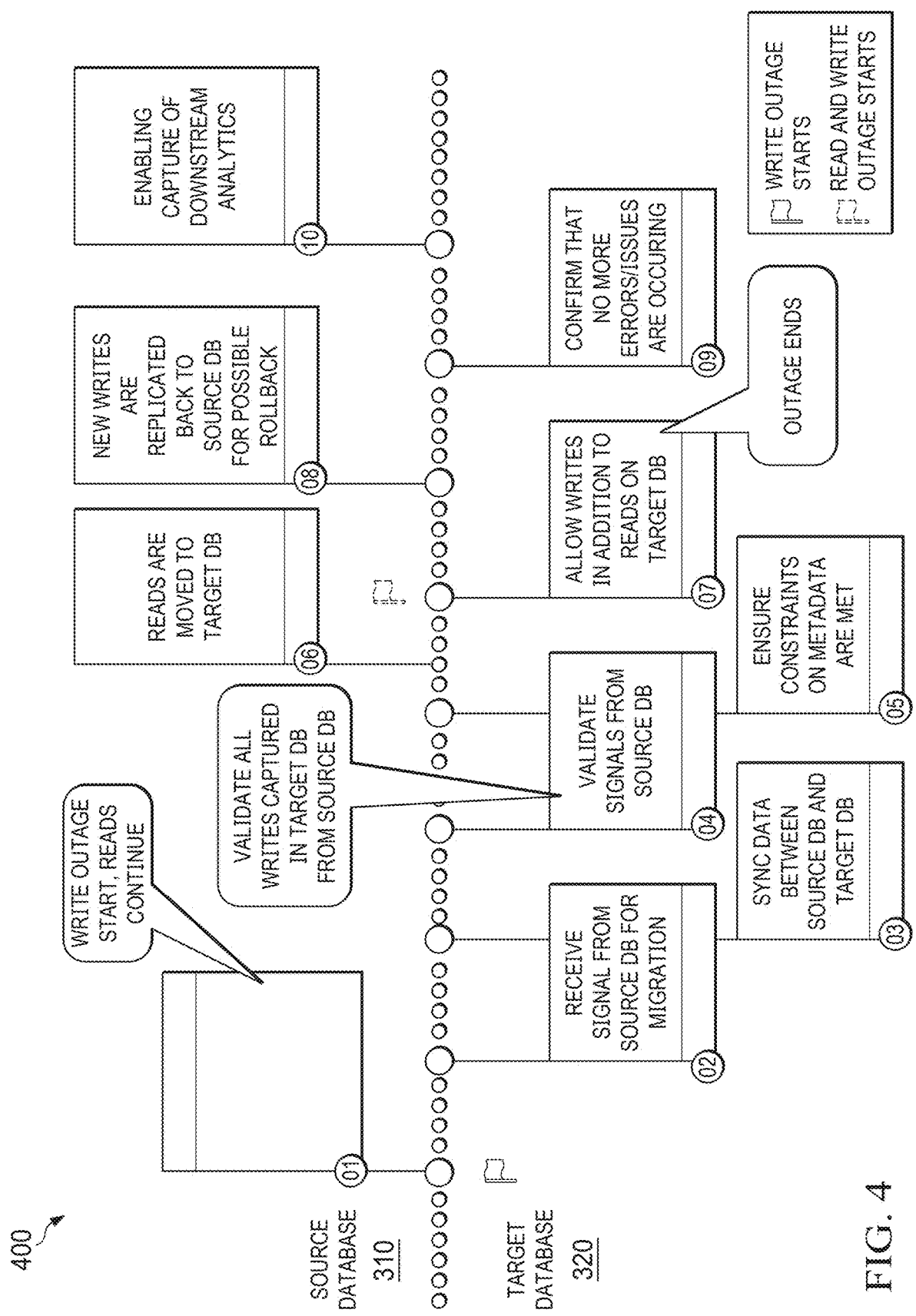
FIG. 4 illustrates another process flow of a database migration according to embodiments of the present disclosure.

Referring now to FIG. 4, a process flow 400 illustrates the database migration of the present disclosure at lower level than the process flow 300 of FIG. 3. For example, the process flow 400 illustrates a series of steps 01-10 that are performed before, during, and/or after the database migration (e.g., before, during, and/or after the steps 360-362 of FIG. 3). It is understood that one or more of the steps 01-10 may be performed at least in part via the gateway client 350 of FIG. 3.

In a step 01 of the process flow 400, the write operation outage (e.g., by pausing the write operations) with respect to the source database 310 starts, while the read operation continues. Meanwhile, both the write operation outage and the read operation outage (e.g., by pausing both the read and write operations) with respect to the target database 320 also start in step 01. In other words, step 01 of the process flow 400 corresponds to parts of the steps 360 and 361 of FIG. 3.

The process flow 400 continues with a step 02, in which the target database 320 may receive signals from the source database 310 regarding the status of the database migration. For example, the signals may inform the source database 310 what is currently being done to the source database 310 (e.g., pausing write operations to the source database 310 but allowing the read operations from the source database 310 to continue, all while the electronic connections with the source database 310 are kept open).

The process flow 400 continues with a step 03, in which various mechanisms may be utilized to ensure that data between the source database 310 and the target database 320 are synchronized. In some embodiments, the step 03 may be performed at least in part by generating numbers via one or more numeric tables. The numbers in the numeric tables may be associated with different segments of the electronic data to be replicated, and they allow the source database 310 and the target database 320 to keep track of which segment of the electronic data needs to be replicated (and when and where), such that the data replication from the source database 310 to the target database 320 may occur in an organized manner.

The process flow 400 continues with a step 04, in which the signals from the source database 310 are validated. For example, the signals from the source database 310 may contain information pertaining to the paused write operations captured in the target database 320 from the source database 310. The information may be examined by a suitable entity (e.g., the gateway client 350) to ensure that no errors exist in the paused write operations. Upon a successful validation (e.g., no errors exist) of the signals from the source database 310, the process flow 400 may continue to the next step. Otherwise, the process flow 400 may pause until the error(s) are resolved. In some embodiments, if errors are detected during signaling to the target database 320, and these errors cannot be resolved within an acceptable downtime, the source database 310 will be reactivated to restore platform availability, rather than pausing process flow 400 for an extended duration. Errors could be encountered during any step in process flow 400, and hence rollback steps may be performed, as discussed below in more detail with reference to FIGS. 5A-5C.

The process flow 400 continues with a step 05, in which a determination is made that constraints on metadata are met. For example, the metadata may contain descriptions about the electronic data that is being (or will be) replicated from the source database 310 to the target database 320. In a simplified example, the data being replicated may include a user's residential address, and the metadata may include the state information (e.g., New York, Florida, Texas, etc.) of the residential address. As a part of step 05, checks may be made to ensure that the residential address is consistent with jurisdictional requirements/specifications. For example, for a user that is supposed to be in the U.S.A., his/her state cannot be anything other than the 50 states of the U.S.A. If the metadata check indicates that a user's state is not one of the 50 states, that would be a violation of the constraints on the metadata, and the process flow 400 may be paused until such a violation is resolved.

The process flow 400 continues with a step 06, in which the read operations are moved to the target database 320. This step 06 may be performed as a part of the step 362 of FIG. 3. As discussed above, the read operations to the target database 320 may be resumed via the electronic connections 380C.

The process flow 400 continues with a step 07, in which the write operations are also moved to the target database 320. This step 06 may also be performed as a part of the step 362 of FIG. 3. As discussed above, the write operations to the target database 320 may be resumed via the electronic connections 380C. It is understood that the steps 06 and 07 may be performed sequentially. In other words, the read operations are allowed to resume on the target database 320 first, and then the write operations are allowed to resume on the target database 320. It is also understood that the read and write outages to the target database 320 end after step 07 is performed.

The process flow 400 continues with a step 08, in which new writes to the target database 320 are replicated back to the source database 310 for possible rollback. As discussed above, the status of the database migration may be monitored for potential issues and/or errors. When the monitoring indicates that one or more specified conditions (e.g., instability of the target database 320 or the source database 310, or errors in the data replication) are met, one or more rollback processes may need to be performed, in which replicated data and new data written to the target database 320 are copied back to the source database 310.

The process flow 400 continues with a step 09, in which a determination is made as to whether any errors and/or issues are still occurring. If no more errors and/or issues are still occurring, the process flow 400 makes a confirmation to that effect and may continue with subsequent steps.

The process flow 400 continues with a step 10, in which the capture of downstream analytics is enabled. For example, the downstream analytics may include a settlement system model, such as a standard transaction model (STM). As an example, the downstream analytics may include financial extract transfer and load (FETL) model. The downstream analytics may allow information to be extracted from the data written into the target database 320 and analyzed for making future decisions, such as making predictions.

Referring now to FIGS. 5A-5D, a process flow 500 illustrates a plurality of different states 501-507 (e.g., different phases) of the database migration of the present disclosure, including the different points for performing various rollback processes. The different states 501-507 may occur before, during, and/or after the process flows 300 and/or 400 discussed above. It is understood that some of the tasks performed in one or more of the states 501-507 may be performed at least in part via the gateway client 350 of FIG. 3.

Figure 5A:
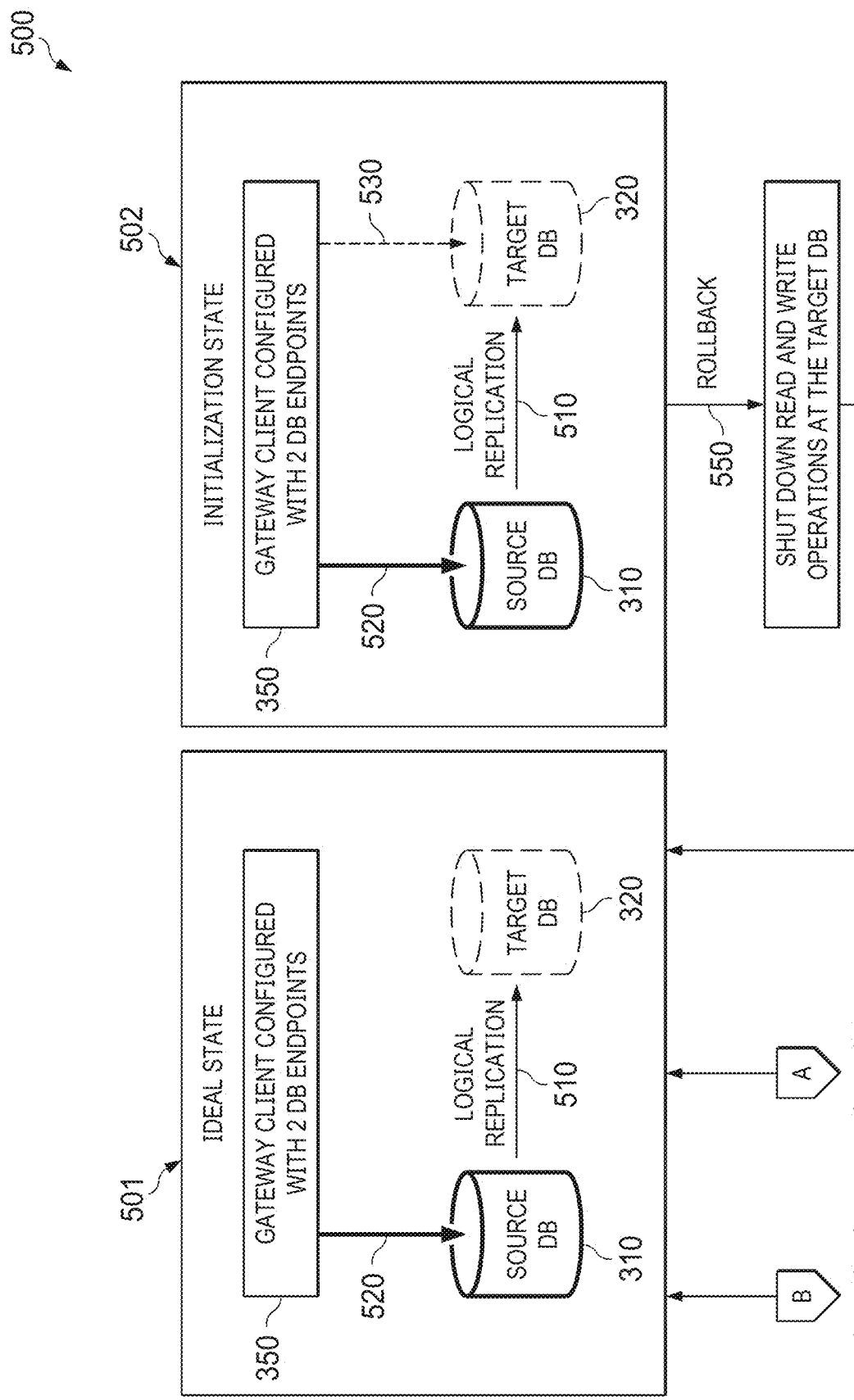
FIGS. 5A, 5B, 5C, and 5D illustrate different states of a database migration according to embodiments of the present disclosure.

Referring to FIG. 5A, the state 501 may be referred to as an "Ideal State." In the state 501, a logical replication 510 (e.g., replication of electronic data from the source database 310 to the target database 320) has not officially begun yet, while the gateway client 350 may be configured with two database endpoints. For example, the gateway client 350 may be configured with an endpoint with the source database 310 and an endpoint with the target database 320. The database endpoint allows the respective database to be exposed to the public Internet. The gateway client 350 also maintains an electronic link 520 with the source database

310, but no electronic link exists between the gateway client 350 and the target database 320 in the state 501. In some embodiments, the electronic link 520 may include a plurality (e.g., at least tens of thousand) of individual electronic connections, such as the electronic connections 370A discussed above with reference to FIG. 3.

The process flow 500 continues to the state 502, also referred to as an "Initialization State." The logical replication 510 still does not officially occur yet, but the gateway client 350 now establishes an electronic link 530 with the target database 320. In some embodiments, the electronic link 530 may include a plurality (e.g., at least tens of thousand) of individual electronic connections, such as the electronic connections 380A discussed above with reference to FIG. 3. Note that at the state 502, read and write operations with respect to the source database 310 may take place via the electronic link 520, but no read or write operations with respect to the target database 320 are taking place via the electronic link 530.

FIG. 5A further illustrates a rollback process 550, which may be performed following the state 502. For example, the status of the process flow 500 may be monitored, and one or more status checks may be performed during or after the state 502. If these status checks indicate one or more errors or issues (e.g., an error in the electronic links 520 or 530, or an observed instability in the source database 310 and/or the target database 320) or a satisfaction of another predefined condition, the process flow 500 may not proceed to the subsequent state, and instead the rollback process 550 is performed. As a part of the rollback process 550, the read and write operations with respect to the target database 320 are shut down, and the process flow 500 reverts back to the state 501.

Figure 5B:
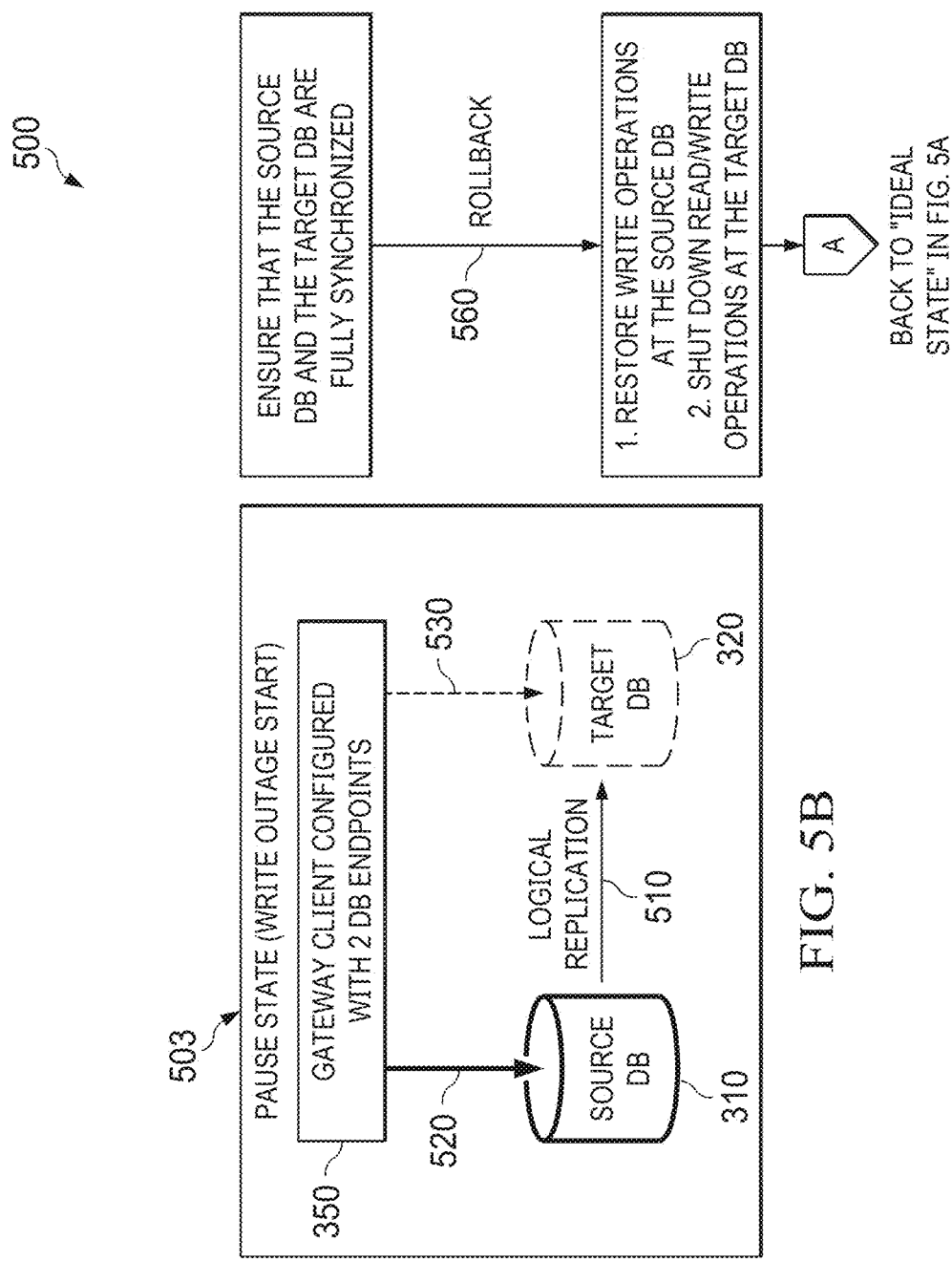

Referring now to FIG. 5B, the process flow 500 proceeds to a state 503, also referred to as a "Pause State." The electronic links 520 and 530 are still open with respect to the source database 310 and the target database 320, respectively. However, the write operations to the source database 310 are paused, while the read operations from the source database 310 are still continuing. Meanwhile, no read or write operations with respect to the target database 320 are taking place via the electronic link 530. Thus, the write outage starts at the states 503, and the logical replication 510 can officially begin, meaning that electronic data may now be copied or moved from the source database 310 to the target database 320. Meanwhile, the read operations from the source database 310 may still be performed via the electronic link 520, which helps to reduce disruptions to applications and/or services that need access to the electronic data stored on the source database 310.

As the processes in the state 503 are performed, the monitoring discussed above may continue, which ensures that the source database 310 and the target database 320 are fully synchronized. If the monitoring indicates any issues, errors, or the meeting of any other specified conditions, a rollback process 560 may be performed. As a part of the rollback process 560, the write operations are restored back at the source database 320, the read operations and write operations with respect to the target database 320 are shut down, and the process flow 500 reverts back to the state 501 of FIG. 5A.

Figure 5C:
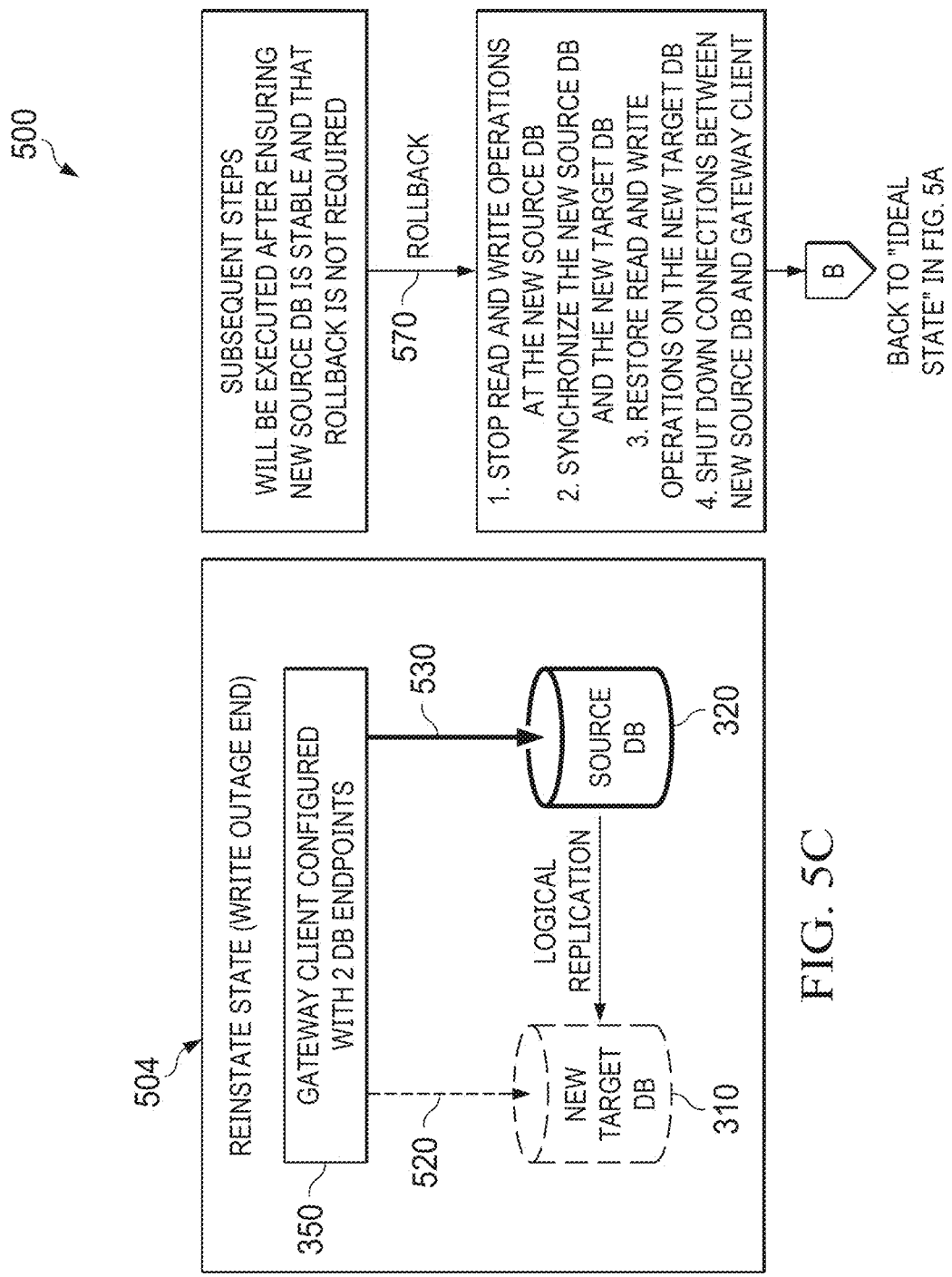

Referring now to FIG. 5C, the process flow 500 proceeds to a state 504, also referred to as a "Reinstate State." The electronic links 520 and 530 are still open with respect to the source database 310 and the target database 320, respectively. Both the read operations and the write operations with respect to the source database 310 are paused. In other words, no requests for read or write operations are sent over the electronic link 520. Meanwhile, the read operations and the write operations with respect to the target database 320 are resumed via the electronic link 530, which means that the requests for read or write operations can now be sent over the electronic link 530. Thus, the write outage ends at the states 504, and the logical replication 510 can end. At this point, the source database 310 may be referred to as a "new target database" 310, and the target database 320 may be referred to as a "new source database" 320. In other words, the roles of the source and target databases may be reversed at this point.

As the processes in the state 504 are performed, the monitoring discussed above may continue, which ensures that the new source database 320 is fully stable. If the monitoring indicates the stability condition is not met (e.g., a much longer response time at the new source database 320 than at the old source database 310), a rollback process 570 may be performed. As a part of the rollback process 570, the read operations and the write operations are shut down at the new source database 320, the new source database 320 and the new target database 310 are synchronized, the read operations and write operations with respect to the new target database 310 are shut down, the connections (e.g., the electronic link 530) between the new source database 320 and the gateway client 350 are shut down, and the process flow 500 reverts back to the state 501 of FIG. 5A.

Figure 5D:
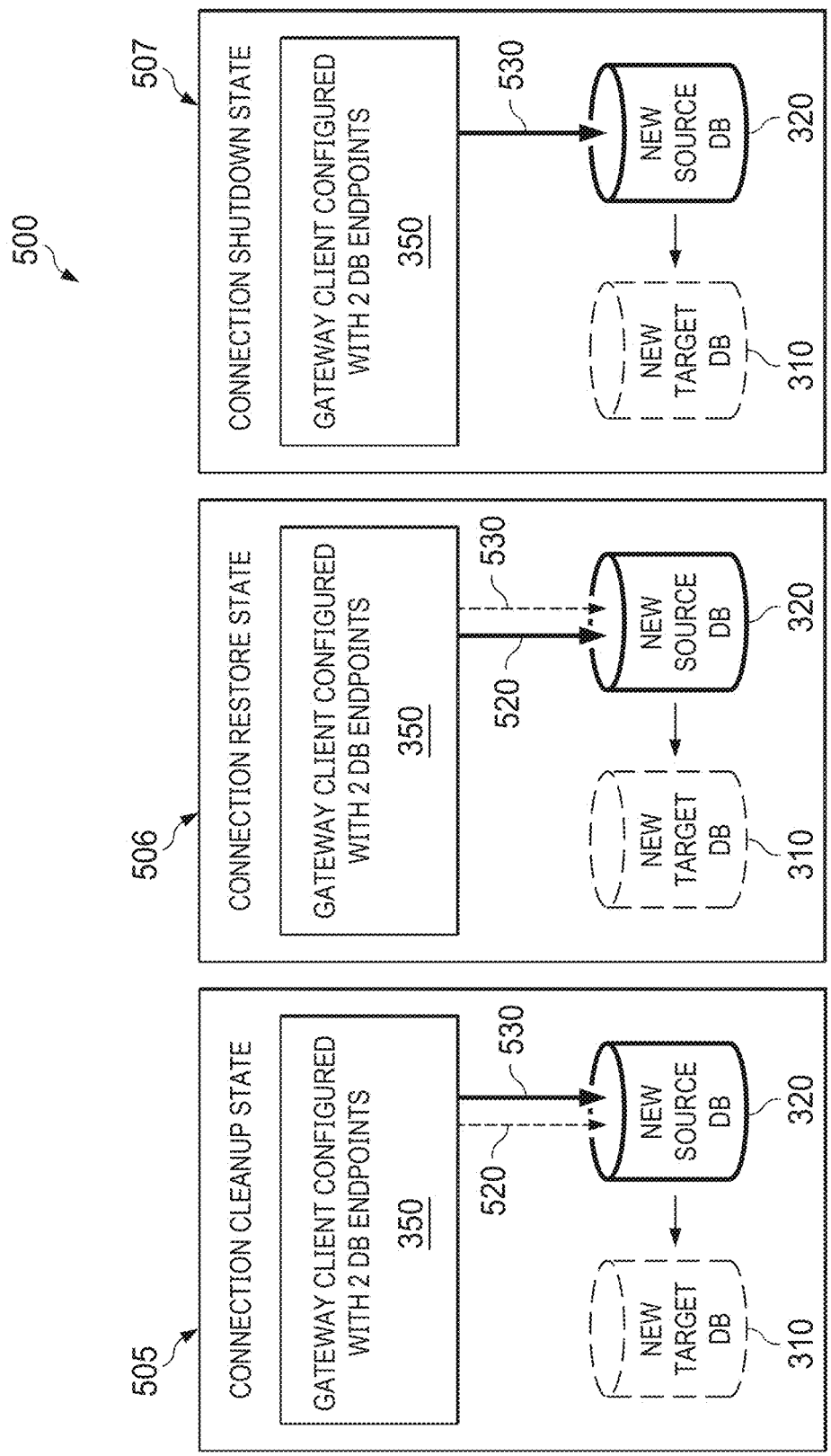

Referring now to FIG. 5D, post-outage activities are illustrated in states 505, 506, and 507. For example, the state 505 immediately following the end of the outages may also be referred to as a "Connection Cleanup State." At the state 505, the electronic link 520 (previously to the new target database 310) is moved to the new source database 320. As such, the gateway client 350 now has both the electronic link 520 and the electronic link 530 with the new source database 320. However, the electronic link 520, though active, does not allow any read or write operations with respect to the new source database 320. Meanwhile, the read and write operations with respect to the new source database 320 may still continue via the electronic link 530. The gateway client 350 also shuts down its connections to the new target database 310.

FIG. 5D also illustrates a state 506, which is also referred to as a "Connection Restore State." In the state 506, the read and write traffic that were previously taking place via the electronic link 520 are now migrated over to the electronic link 530. Lastly, in a state 507, also referred to as "Connection Shutdown State", the electronic link 520 is released. Thus, the only electronic link remaining between the gateway client 350 and the new source database 320 is the electronic link 530 at the state 507.

Below is sample pseudo programming code that may be used to implement at least portions of the process flows 300, 400, or 500. Note that the pseudo programming code is provided merely as an example and does not limit the scope of the present disclosure unless otherwise claimed.

Database Requirement:
    The cutover config table includes the following for source and target respectively:
    1. logical database identifier
    2. physical database identifier
    3. proxy identifier
    4. cutover phase (pre-cutover, cutover, post-cutover)
    5. read status (allow/stop read only SQL)
    6. write status (allow/stop write/transactional sql)

At a given point in time, there is at most one active database in the config table (regardless it's for read, write or read & write)

The cutover config table can resides in in or more of the source and/or target databases and is typically synchronized.

The proxy software pseudo code:

```
StartServer {
    create_connection_pool(source)
    create_connection_pool(target)
    create_cutover_config_thread {
        1. load config from the active db periodically
        2. save the loaded config in local memory
        3.
        if cutover is in-progress
            enforce_connections_integrity
        end if
    }
    enable_listener_to_inbound_sql
}
Input: database logical identifier
create_connection_pool {
    loop until desired size:
        use logical identifier look up physical identifier and
            create persistent connection
    end loop
}
enable_listerner_to_inbound_sql {
    loop:
        handle_client_connection( );
    end loop:
}
Input: requests sent over network
handle_client_connection {
    for each received sql request:
        1. determine read or write (transactional) sql type
        2. load latest cutover config from local memory
        3. determine source or target connection to use
        4. if the sql type is not allowed
            stop the sql
        else
            dispatch the request to that connection
        end if
    end for loop
}
Input: database physical identifier
enforce_connections_integrity {
    for both source and target connection pool:
        ensure all connections are connected to the specified
            physical database
}
```

Figure 6:
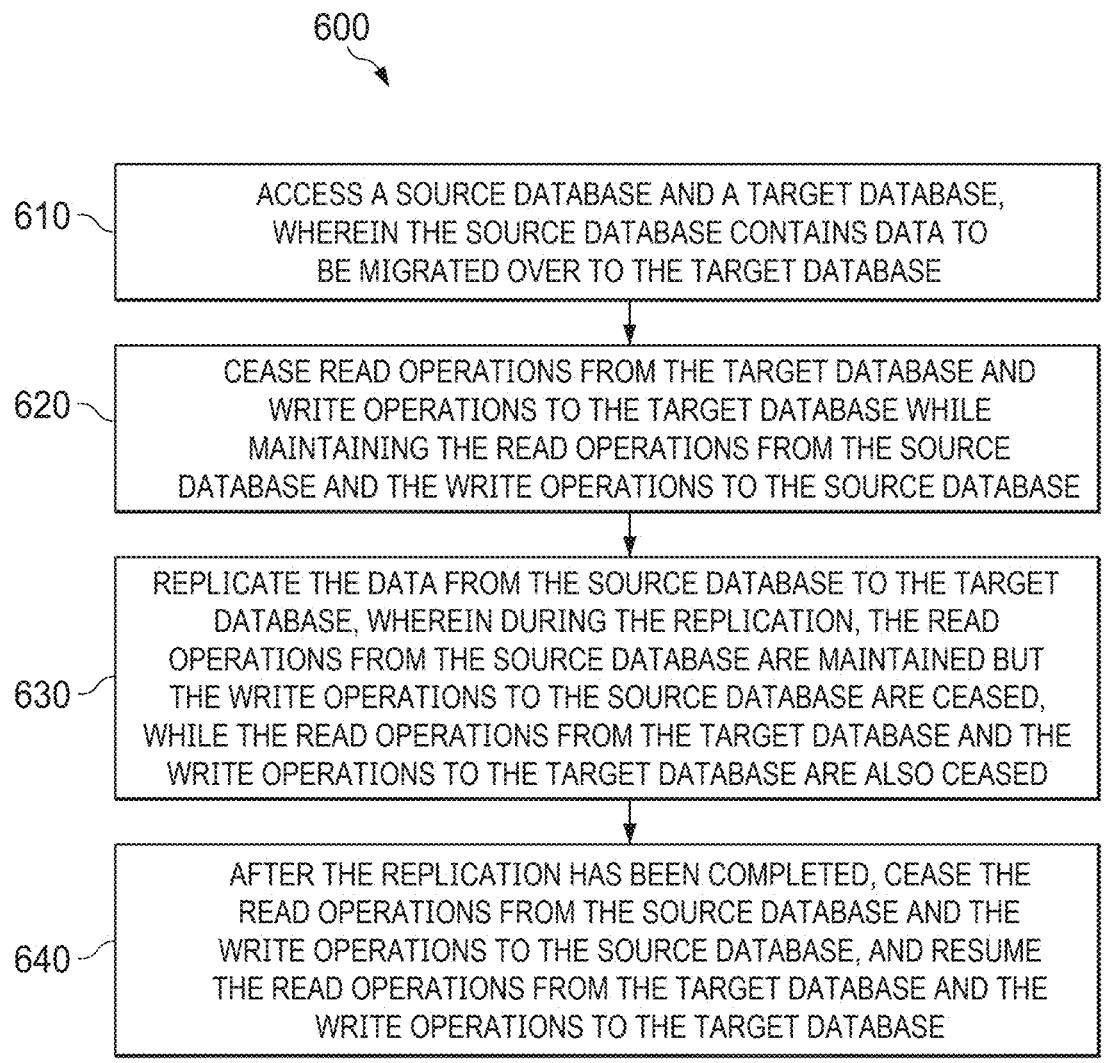
FIG. 6 is a flowchart illustrating a database migration process according to various aspects of the present disclosure.

FIG. 6 is a flowchart illustrating a method 600 for performing a database migration process according to various aspects of the present disclosure. The various steps of the method 600, which are described in greater detail above, may be performed by one or more electronic processors, for example by the processors of a computer of an entity that may include (but are not limited to): a service provider, a business analyst, or a merchant. The networked system described with respect to FIG. 1 lists some example databases that could be the subject of the database migration, such as the databases 195 and/or 145. FIGS. 2-4 and 5A-5D also provide some example source and target databases for the database migration, such as the source databases 1-N and the target databases 1-N of FIG. 2, or the source database 310 and the target database 320 of FIGS. 3-4 and 5A-5B. In some embodiments, at least some of the steps of the method 600 may be performed by the gateway client 350 discussed above, which may serve as an electronic interface between a plurality of user devices and the source database and the target database.

The method 600 includes a step 610 to access a source database and a target database. The source database contains data to be migrated over to the target database. As non-limiting examples, the source database may be implemented as one of the source databases 1-N of FIG. 2 or the source database 310 of FIGS. 3-4 and 5A-5B. The target database may be implemented as one of the target databases 1-N of FIG. 2 or the target database 320 of FIGS. 3-4 and 5A-5B. In some embodiments, in step 610, a plurality of electronic connections (e.g., the electronic connections 370/380 of FIG. 3) with the source database and the target database are accessed. The plurality of electronic connections may exceed a specified number, for example, over ten thousand or several tens of thousands. In some embodiments, during a data replication process as a part of the database migration process, the plurality of electronic connections are kept open with respect to both the source database and the target database.

The method 600 includes a step 620 to cease (e.g., by pausing) read operations from the target database and write operations to the target database while maintaining the read operations from the source database and the write operations to the source database. For example, as shown in the step 360 of FIG. 3, the read operations from the target database and write operations to the target database 320 are paused (even though the electronic connections 380A are still active or otherwise kept open), while the read operations from the source database 310 and the write operations to the source database 310 may continue via the electronic connections 370A.

The method 600 includes a step 630 to replicate the data from the source database to the target database. During the replication of the data, the read operations from the source database are maintained but the write operations to the source database are ceased, while the read operations from the target database and the write operations to the target database are also ceased. For example, as shown in the step 361 of FIG. 3, the data replication 390 takes place by copying data from the source database 310 to the target database 320, while the write operations to the source database 310 are also paused as well, while the electronic connections 380B are still kept open. However, the read operations from the source database 310 may still continue via the electronic connections 370B, which helps to minimize the potential disruptions to the applications or services 330 that may still need to read data from the source database 310 during the database migration.

The method 600 includes a step 640 that is performed after the replication of the data has been completed. The step 640 is performed by ceasing the read operations from the source database and the write operations to the source database, and resuming the read operations from the target database and the write operations to the target database. For example, as shown in step 362 of FIG. 3, the data replication 390 is completed, and the read operations from the source database 310 are also paused (in addition to the previously paused write operations to the source database 310 in step 361). Meanwhile, the read operations from the target database 320 and the write operations to the target database 320 are resumed via the electronic connections 380C. Since the electronic connections to the source and target databases were never shut down before or during the data replication 390, they do not need to be re-established at the end of data replication 390. This helps conserve electronic resources, since a great deal of electronic resources would have been expended (e.g., more than the resources needed to keep the electronic connections open during the data replication 390) to re-establish the electronic connections to the databases.

In some embodiments, after the read operations from the target database have been ceased or after the write operations to the target database have been ceased but before the migrating has started, the plurality of electronic connections are kept open with respect to both the source database and the target database. In some embodiments, after the read operations from the target database have been resumed or after the write operations to the target database have been resumed, the plurality of electronic connections are kept open with respect to both the source database and the target database.

In some embodiments, the read operations from the target database and the write operations to the target database are not resumed all at once but according to a specified schedule. For example, a certain subset (e.g., X %) of the read and/or write operations may resume at predefined time points (e.g., every Y number of seconds).

In some embodiments, the resuming in step 640 is performed such that the read operations from the target database is resumed before the write operations to the target database is resumed. In other words, the resumption of the read operations and the write operations may be sequential.

In some embodiments, the data to be migrated comprises data associated with an execution of a mobile application, and the mobile application is allowed to perform a subset of tasks without disruption while the data is migrated from the source database to the target database. For example, a mobile application may read from the source database to perform certain tasks (e.g., logging into a user account and populating certain segments of a user interface of the mobile application). These functionalities and/or services do not require writing data to the source database, and therefore the users may not even notice any disruption to the execution of the mobile application during the database migration process.

It is understood that additional method steps may be performed before, during, or after the steps 610-640 discussed above. For example, the method 600 may include a step of monitoring a status of the database migration process (including during, before, and/or after the data replication performed as a part of the database migration), as well as a step of performing one or more rollback processes when the monitored status meets one or more specified criteria. In some embodiments, the one or more rollback processes may comprise: a first rollback process (e.g., the rollback process 550 of FIG. 5A) when the monitored status indicates one or more first specified criteria have been met before the replication of the data began; a second rollback process (e.g., the rollback process 560 of FIG. 5B) when the monitored status indicates one or more second specified criteria have been met during the replication of the data; or a third rollback process (e.g., the rollback process 570 of FIG. 5C) when the monitored status indicates one or more third specified criteria have been met at an end of the replication of the data.

Figure 7:
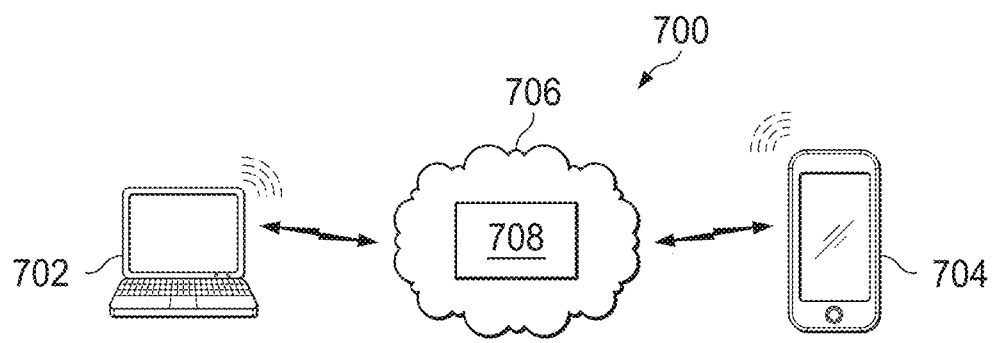
FIG. 7 is a simplified example of a cloud-based computing architecture according to various aspects of the present disclosure.

FIG. 7 illustrates an example cloud-based computing architecture 700, which may also be used to implement various aspects of the present disclosure. The cloud-based computing architecture 700 includes a mobile device 704 (e.g., the user device 110 of FIG. 1) and a computer 702 (e.g., the merchant server 140 or the payment provider server 170), both connected to a computer network 706 (e.g., the Internet or an intranet). In one example, a consumer has the mobile device 704 that is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing may be performed by the cloud-based resources 708. However, other divisions of responsibility are also possible in various embodiments. In some embodiments, using this cloud architecture, the gateway client 350 discussed above may reside on the servers 171, on the payment provider server 170, or on another suitable server device, but its functionalities can be accessed or utilized by the mobile device 704, or vice versa.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702. The system and method for performing the various processes discussed above may be implemented at least in part based on the cloud-based computing architecture 700.

It is understood that the various components of cloud-based computing architecture 700 are shown as examples only. For instance, a given user may access the cloud-based resources 708 by a number of devices, not all of the devices being mobile devices. Similarly, a merchant or another user may access the cloud-based resources 708 from any number of suitable mobile or non-mobile devices. Furthermore, the cloud-based resources 708 may accommodate many merchants and users in various embodiments.

Figure 8:
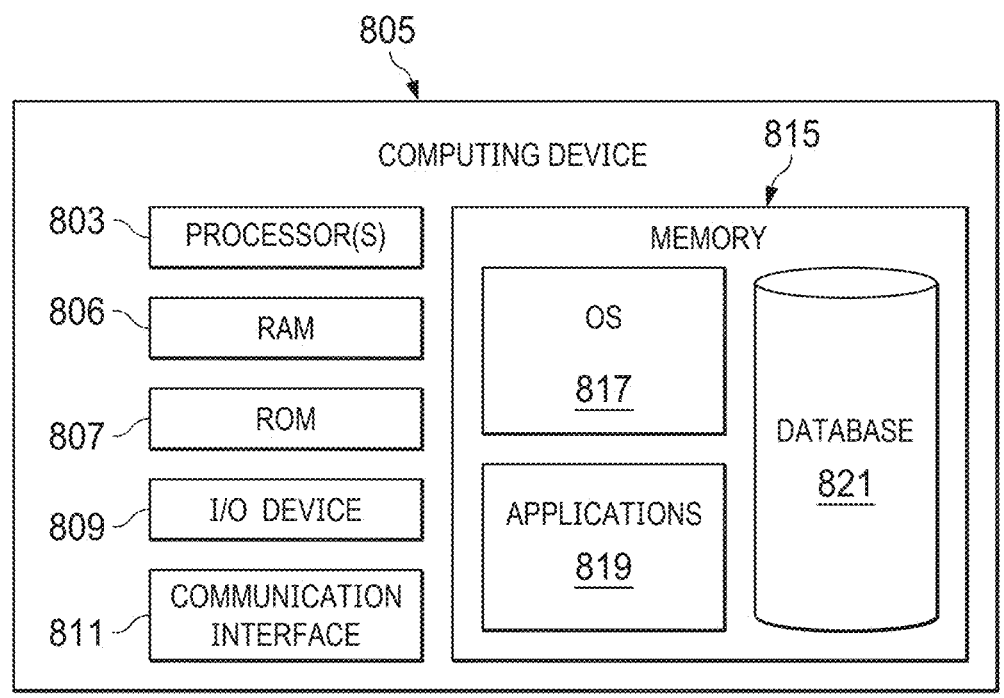
FIG. 8 illustrates a computer system according to various aspects of the present disclosure.

Turning now to FIG. 8, a computing device 805 that may be used with one or more of the computational systems is described. The computing device 805 may be used to implement various computing devices discussed above with reference to FIGS. 1-8. For example, the computing device 805 may be used to implement at least a part of the gateway client 350 of FIG. 3, and/or other components (e.g., the databases 195) of the payment provider server 170.

Furthermore, the computing device 805 may be used to implement the user device 110, the merchant server 140, the acquirer host 165, the issuer host 168, or portions thereof, in various embodiments. The computing device 805 may include one or more processors 803 for controlling overall operation of the computing device 805 and its associated components, including RAM 806, ROM 807, input/output device 809, communication interface 811, and/or memory 815. A data bus may interconnect processor(s) 803, RAM 806, ROM 807, memory 815, I/O device 809, and/or communication interface 811. In some embodiments, computing device 805 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 809 may include a microphone, keypad, touch screen, and/or stylus motion, gesture, through which a user of the computing device 805 may provide input, and may also include one or more speakers for providing audio output and a video display device for providing textual, audiovisual, and/or graphical output. Software may be stored within memory 815 to provide instructions to processor(s) 803 allowing computing device 805 to perform various actions. For example, memory 815 may store software used by the computing device 805, such as an operating system 817, application programs 819, and/or an associated internal database 821. The various hardware memory units in memory 815 may include volatile and nonvolatile, removable and non-removable media implemented in any method or technology for storage of information such as computer-readable instructions, data structures, program modules, or other data. Memory 815 may include one or more physical persistent memory devices and/or one or more non-persistent memory devices. Memory 815 may include, but is not limited to, random access memory (RAM) 806, read only memory (ROM) 807, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor(s) 803.

Communication interface 811 may include one or more transceivers, digital signal processors, and/or additional circuitry and software for communicating via any network, wired or wireless, using any protocol as described herein.

Processor(s) 803 may include a single central processing unit (CPU) in some embodiments, which may be a single-core or multi-core processor, or it may include multiple CPUs in other embodiments. In some embodiments, the processor(s) 803 may include one or more GPUs, in addition to, or in lieu of, the CPUs. The processor(s) 803 and associated components may allow the computing device 805 to execute a series of computer-readable instructions to perform some or all of the processes described herein. Although not shown in FIG. 8, various elements within memory 815 or other components in computing device 805, may include one or more caches, for example, CPU/GPU caches used by the processor 803, page caches used by the operating system 817, disk caches of a hard drive, and/or database caches used to cache content from database 821. For embodiments including a CPU/GPU cache, the CPU/GPU cache may be used by one or more processors 803 to reduce memory latency and access time. Processor(s) 803 may retrieve data from or write data to the CPU/GPU cache rather than reading/writing to memory 815, which may improve the speed of these operations. In some examples, a database cache may be created in which certain data from a database 821 is cached in a separate smaller database in a memory separate from the database, such as in RAM 806 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 805 are described separately, functionality of the various components may be combined and/or performed by a single component and/or multiple computing devices in communication without departing from the invention.

It should be appreciated that like reference numerals are used to identify like elements illustrated in one or more of the figures, wherein these labeled figures are for purposes of illustrating embodiments of the present disclosure and not for purposes of limiting the same.

Based on the above discussions, it can be seen that the present disclosure offers several significant advantages over conventional database migration schemes. It is understood, however, that not all advantages are necessarily discussed in detail here, different embodiments may offer different advantages, and that no particular advantage is required for all embodiments. One advantage is improved functionality of a computer. For example, conventional computer systems for performing and/or managing database migration shut down not only write operations but also the read operations from both a source database and a target database at some point during the database migration. In addition to causing potential disruptions to applications or services that may need to access the database data, such a scheme also requires a large number of electronic connections to be re-established with the target database at the end of the migration, which may unduly prolong the database outage time and waste electronic resources needed to re-establish the connections.

In contrast, the deployment of a gateway client (e.g., the gateway client 350 discussed above) may transform an otherwise ordinary computer into a specialized tool that can minimize potential disruptions to the applications and/or services that need to access the database data during the database migration. For example, the gateway client, through its carefully configured operations with respect to the source and target databases, enables at least the read operations to be performed throughout the database migration process. The availability of the read operations allows the applications or services to still execute at least some of their intended tasks and/or provide their intended functionalities, since these tasks and/or functionalities may need to be able to read from a database but not write to the database. Beneficially, an end user of these applications and/or services may not even notice a disruption. Furthermore, the gateway client also keeps the large number of electronic connections open with respect to the source and target databases throughout the database migration process. As a result, there is no need to re-establish these electronic connections at the end of the database migration process. Therefore, electronic resources (e.g., computer processing power, electronic memory usage, and/or network bandwidth) are conserved. In addition, the overall down time of the databases is reduced, which translates to a capability of achieving a faster database migration process—another indication of an improvement of the performance of the computer system of the present disclosure. The inventive ideas of the present disclosure are also integrated into a practical application, for example into the gateway client 350 discussed above. Such a practical application can achieve a faster database migration cycle with a shortened database down time, as well as reduced disruptions to the applications and/or services that need access to the database to perform certain tasks.

One aspect of the present disclosure involves a method. The method includes: accessing a source database and a target database, wherein the source database contains data to be migrated over to the target database; ceasing read operations from the target database and write operations to the target database while maintaining the read operations from the source database and the write operations to the source database; migrating the data from the source database to the target database, wherein during the migrating, the read operations from the source database are maintained but the write operations to the source database are ceased, while the read operations from the target database and the write operations to the target database are also ceased; and after the migrating has been completed, ceasing the read operations from the source database and the write operations to the source database, and resuming the read operations from the target database and the write operations to the target database.

Another aspect of the present disclosure involves a system that includes a non-transitory memory and one or more hardware processors coupled to the non-transitory memory and configured to read instructions from the non-transitory memory to cause the system to perform operations comprising: accessing a plurality of first electronic connections with a source database and a plurality of second electronic connections with a target database, wherein the plurality of first electronic connections and the plurality of second electronic connections are established before data from the source database is replicated to the target database; preparing for a replication of the data from the source database to the target database, wherein the preparing comprises: stopping read operations from the target database and write operations to the target database while the plurality of second electronic connections are kept open; and continuing the read operations from the source database and the write operations to the source database at least in part via the plurality of first electronic connections; replicating the data from the source database to the target database, wherein the replicating comprises: stopping the write operations to the source database while continuing the read operations from the source database at least in part via the plurality of first electronic connections; and stopping the write operations to the target database in addition to stopping the read operations from the target database while the plurality of second electronic connections are kept open; and after the data has been replicated: stopping the read operations from the source database in addition to stopping the write operations to the source database while the plurality of first electronic connections are kept open; and resuming the read operations from the target database and the write operations to the target database at least in part via the plurality of second electronic connections.

Yet another aspect of the present disclosure involves a non-transitory machine-readable medium having stored thereon machine-readable instructions executable to cause a machine to perform operations comprising: performing a first step of a data replication process at least in part by pausing read operations from a target database and write operations to the target database, while the read operations from a source database and the write operations to the source database continue during the first step of the data replication process; performing a second step of the data replication process at least in part by replicating electronic data from the source database to the target database, wherein during the second step of the data replication process, the write operations to the source database are paused while the read operations from the source database still continue, and the write operations to the target database are also paused in addition to the read operations from the target database being paused; and performing a third step of the data replication process at least in part by pausing the read operations from the source database in addition to the write operations to the source database being paused, wherein the third step of the data replication process further comprises resuming the read operations from the target database and the write operations to the target database; wherein a plurality of electronic connections are kept open with both the source database and the target database throughout the first step, the second step, and the third step of the data replication process.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, while protected attributes are described, non-protected attributes that may unfairly bias a user and have no bearing on a decision to offer a benefit or protect are also part of present disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
accessing a source database and a target database, wherein the source database contains data to be migrated over to the target database;
ceasing read operations from the target database and write operations to the target database while maintaining read operations from the source database and write operations to the source database;
replicating the data from the source database to the target database, wherein during the replicating, the read operations from the source database are maintained but the write operations to the source database are ceased, while the read operations from the target database and the write operations to the target database are also ceased; and
after the replicating has been completed, ceasing the read operations from the source database and the write operations to the source database, and resuming the read operations from the target database and the write operations to the target database.

2. The method of claim 1, wherein one or more of the ceasing of the read operations or the write operations, the maintaining of the read operations or the write operations, or the resuming of the read operations or the write operations is performed by a gateway client serving as an electronic interface between a plurality of user devices and the source database and the target database.

3. The method of claim 1, wherein the accessing comprises accessing a plurality of electronic connections with the source database and the target database, and wherein the plurality of electronic connections exceeds a specified number.

4. The method of claim 3, wherein during the replicating, the plurality of electronic connections are kept open with respect to both the source database and the target database.

5. The method of claim 3, wherein after the read operations from the target database have been ceased or after the write operations to the target database have been ceased but before the replicating has started, the plurality of electronic connections are kept open with respect to both the source database and the target database.

6. The method of claim 3, wherein after the read operations from the target database have been resumed or after the write operations to the target database have been resumed, the plurality of electronic connections are kept open with respect to both the source database and the target database.

7. The method of claim 1, wherein the read operations from the target database and the write operations to the target database are not resumed all at once but according to a specified schedule.

8. The method of claim 1, wherein the resuming is performed such that the read operations from the target database are resumed before the write operations to the target database are resumed.

9. The method of claim 1, further comprising:
monitoring a status of the replicating; and
performing one or more rollback processes when the monitored status meets one or more specified criteria.

10. The method of claim 9, wherein the one or more rollback processes comprise:
a first rollback process when the monitored status indicates one or more first specified criteria have been met before the replicating began;
a second rollback process when the monitored status indicates one or more second specified criteria have been met during the replicating; or
a third rollback process when the monitored status indicates one or more third specified criteria have been met at an end of the replicating.

11. The method of claim 1, wherein the data to be migrated comprises data associated with an execution of a mobile application, and wherein the mobile application is able to perform a subset of tasks without disruption while the data is being replicated from the source database to the target database.

12. A system, comprising:
one or more hardware processors; and
a non-transitory computer-readable medium having stored thereon instructions that are executable by the one or more hardware processors to cause the system to perform operations comprising:
accessing a plurality of first electronic connections with a source database and a plurality of second electronic connections with a target database, wherein the plurality of first electronic connections and the plurality of second electronic connections are established before data from the source database is replicated to the target database;
preparing for a replication of the data from the source database to the target database, wherein the preparing comprises:
stopping read operations from the target database and write operations to the target database while the plurality of second electronic connections are kept open; and
continuing read operations from the source database and write operations to the source database at least in part via the plurality of first electronic connections;
replicating the data from the source database to the target database, wherein the replicating comprises:
stopping the write operations to the source database while continuing the read operations from the source database at least in part via the plurality of first electronic connections; and
stopping the write operations to the target database in addition to stopping the read operations from the target database while the plurality of second electronic connections are kept open; and
after the data has been replicated:
stopping the read operations from the source database in addition to stopping the write operations to the source database while the plurality of first electronic connections are kept open; and
resuming the read operations from the target database and the write operations to the target database at least in part via the plurality of second electronic connections.

13. The system of claim 12, wherein the plurality of first electronic connections are kept open for a specified time after the data has been replicated.

14. The system of claim 12, wherein the resuming comprises resuming the read operations from the target database and the write operations to the target database in different batches via the plurality of second electronic connections.

15. The system of claim 12, wherein the operations further comprise:
monitoring one or more conditions during the preparing, the replicating of the data, and after the data has been replicated; and
performing one or more rollback processes when the monitoring indicates one or more specified conditions have been met.

16. The system of claim 15, wherein the one or more rollback processes comprise:
a first rollback process when the monitoring indicates that at least some of the one or more specified conditions have occurred during the preparing;
a second rollback process when the monitoring indicates that at least some of the one or more specified conditions have occurred during the replicating of the data; or
a third rollback process when the monitoring indicates that at least some of the one or more specified conditions have occurred after the data has been replicated.

17. The system of claim 12, wherein the data replicated comprises data associated with an execution of a mobile application, and wherein at least some of a plurality of functionalities of the mobile application are accessible during the replicating of the data.

18. A non-transitory machine-readable medium having stored thereon machine-readable instructions executable to cause a machine to perform operations comprising:
performing a first step of a database migration process at least in part by pausing read operations from a target database and write operations to the target database, while read operations from a source database and write operations to the source database continue during the first step of the database migration process;
performing a second step of the database migration process at least in part by replicating electronic data from the source database to the target database, wherein during the second step of the database migration process, the write operations to the source database are paused while the read operations from the source database still continue, and the write operations to the target database are also paused in addition to the read operations from the target database being paused; and
performing a third step of the database migration process at least in part by pausing the read operations from the source database in addition to the write operations to the source database being paused, wherein the third step of the database migration process further comprises resuming the read operations from the target database and the write operations to the target database;
wherein a plurality of electronic connections are kept open with both the source database and the target database throughout the first step, the second step, and the third step of the database migration process.

19. The non-transitory machine-readable medium of claim 18, wherein the operations further comprise performing, based on a satisfaction of one or more specified error conditions, one or more rollback processes in which data replicated to the target database are restored back to the source database.

20. The non-transitory machine-readable medium of claim 18, wherein the electronic data comprises data associated with an execution of a mobile application, and the mobile application is partially functional during at least the second step of the data replication process.

* * * * *